Figure 1:
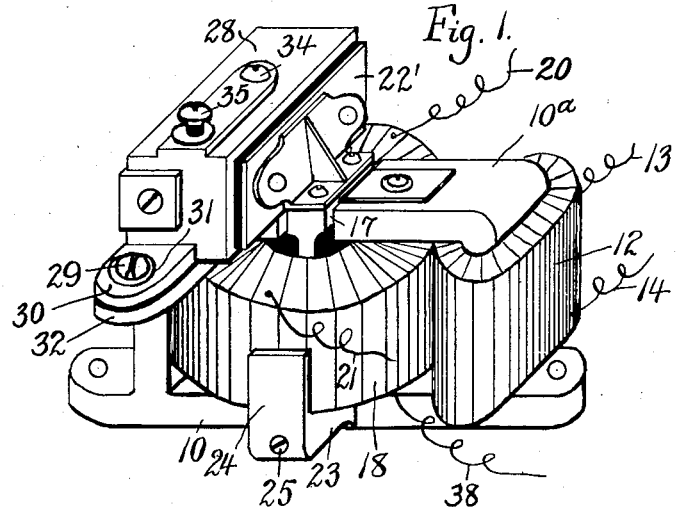

J. K. ELDERKIN, Jr.
SYSTEM OF ELECTRICAL RECTIFICATION AND DISTRIBUTION.
APPLICATION FILED OCT. 30, 1916.

1,325,357.

Patented Dec. 16, 1919.
2 SHEETS—SHEET 1.

INVENTOR
JAMES Knox ELDERKIN Jr.
BY
Dyke & Canfield
ATTORNEYS

UNITED STATES PATENT OFFICE.

JAMES KNOX ELDERKIN, JR., OF NEWARK, NEW JERSEY, ASSIGNOR TO ELECTRIC RECTIFIER COMPANY, OF EAST ORANGE, NEW JERSEY, A CORPORATION OF NEW JERSEY.

SYSTEM OF ELECTRICAL RECTIFICATION AND DISTRIBUTION.

1,325,357.  Specification of Letters Patent.  Patented Dec. 16, 1919.

Application filed October 30, 1916. Serial No. 128,442.

*To all whom it may concern:*

Be it known that I, JAMES KNOX ELDERKIN, Jr., a citizen of the United States, and a resident of Newark, county of Essex, and State of New Jersey, have invented certain new and useful Improvements in Systems of Electrical Rectification and Distribution, of which the following is a specification.

This invention relates to improvements in electrical rectification and distribution, such improvements being designed to secure the rectification of alternating current, and the means of distribution to which the present invention is directed being adapted to make it possible to rectify alternating current of comparatively high voltages with a very high percentage of efficiency, as well as current of low voltage. The apparatus heretofore available for the rectification of alternating current has been limited to comparatively low voltages, and low ampere output because the negative wire of the rectified circuit was taken from the center or neutral point of a transformer. This method of connecting causes inductance in the rectified circuit due to the D. C. impulses having to traverse one-half of the total transformer winding. With such arrangement, when the rectifier contacts are set in a given position sparkless operation may be secured for a given D. C. output, but when the ampere rate is changed or varied, due to a variation in the load, disastrous sparking occurs which makes the device inoperative on high voltage, the effect of the inductance or impedance being to sustain an arc across the vibrator contacts during the time they are supposed to be open, whereby the rectifier is rendered inoperative at once. By the improved means of distribution which I have invented such limitation is removed and it becomes readily possible, by properly distributing the current in accordance with my invention, to efficiently rectify currents through a considerable range of voltage, and by eliminating the effect of inductance and consequent sparking a much higher amperage output is obtained than would otherwise be possible.

In my improved system of distribution I make use of rectifying apparatus units designed to permit the passage and rectification of the current impulses of the alternating current in but a single direction, and I so arrange such rectifying units as that it becomes readily possible to utilize both directional impulses of the alternating current and to secure substantially complete rectification thereof.

With the foregoing and related objects in view, my invention consists in the apparatus, improvements, combinations and processes herein set forth and claimed.

Figure 2:
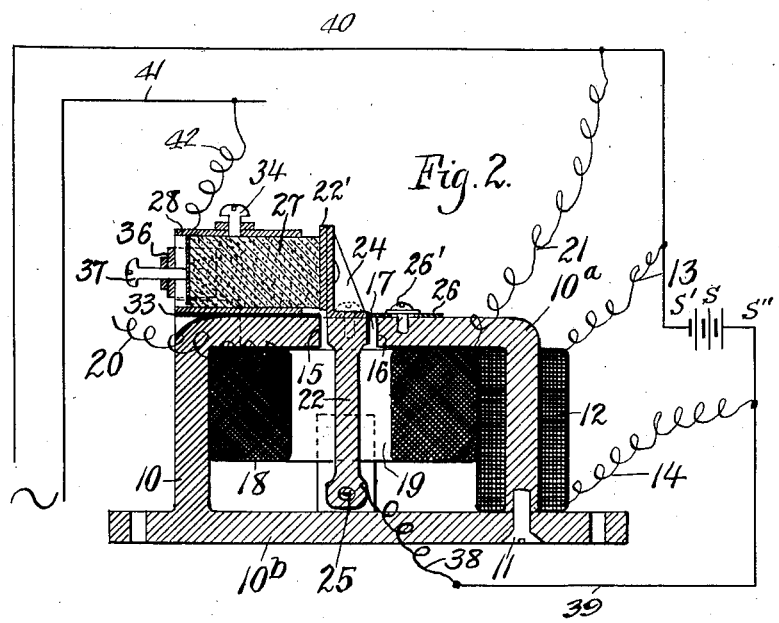
Figure 3:
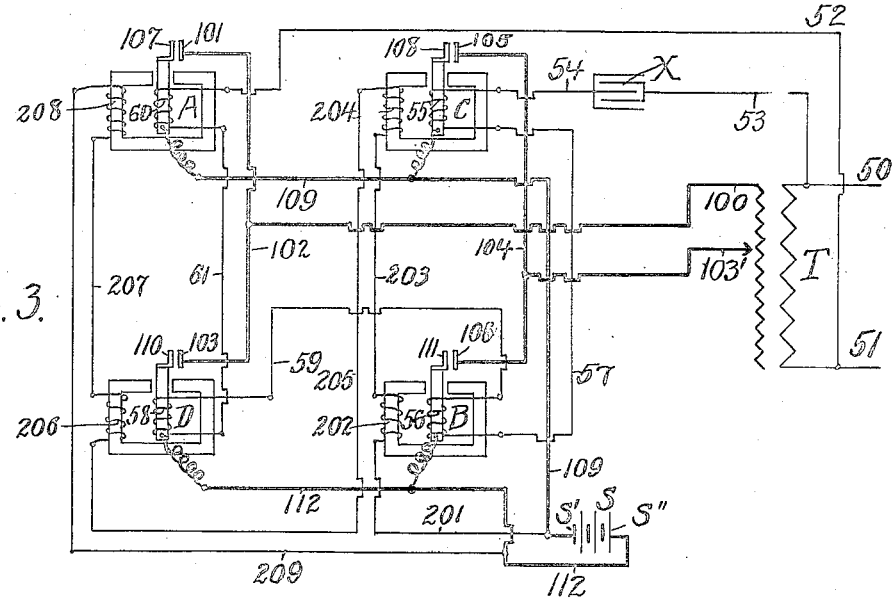
Figure 4:
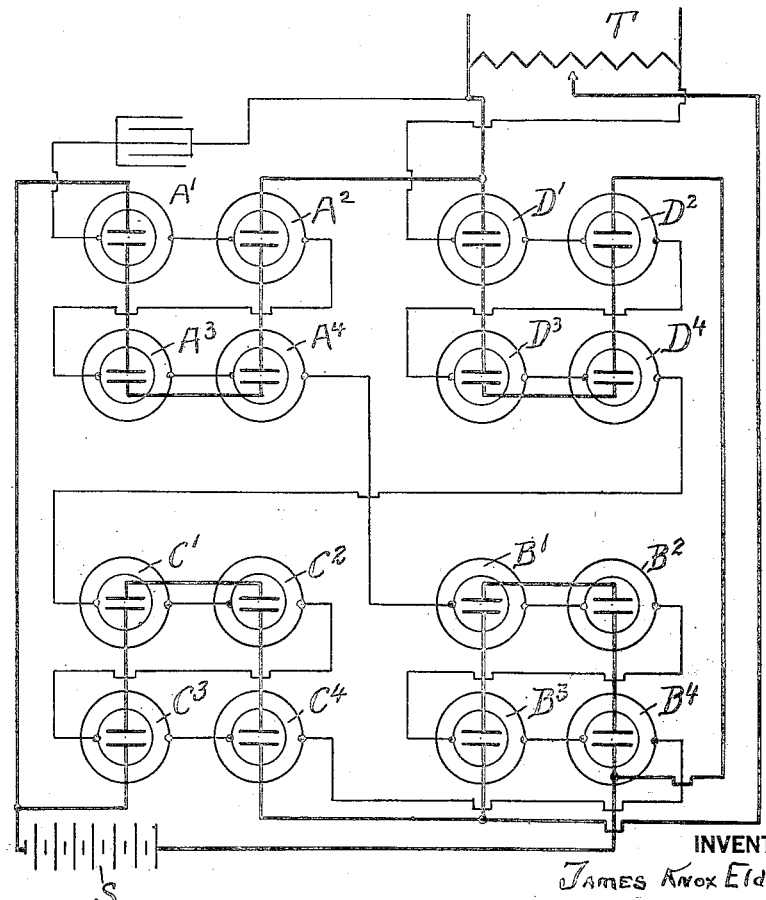

In the accompanying drawings, forming a part of this specification and wherein the same reference characters are applied uniformly to designate the same parts througnout, Figure 1 is a perspective view of a relay or vibrator rectifying device which I prefer to use. Fig. 2 is a central, longitudinal, cross-sectional view of the device shown in Fig. 1, showing circuit connections. Fig. 3 is a diagrammatic view showing one mode of electrical distribution making use of the vibratory rectifying device shown in Fig. 2, and Fig. 4 is a diagrammatic view illustrating circuit connections of a similar system embodying my invention and adapted for the rectification of current of high voltage.

Referring now to Figs. 1 and 2, reference characters 10 and $10^a$ represent the two-part core of an electromagnet, preferably formed of cast iron. These parts are secured together by any suitable means, as screws 11, and the portion $10^a$ has wound about it the magnet coil 12, through which direct current is passed as by means of connections 13 and 14 and the wires 39 and 40 and the battery S. The poles of such magnet are indicated by the characters 15 and 16, leaving between them a magnetic gap 17. Such magnet may be constructed in a variety of ways, but I prefer the form shown, which may be in two pieces for convenience in construction and in winding the coil 12. A permanent magnet may be used in place of the electromagnet.

The coil 18, preferably placed within the core $10^a$ of the magnet and so that its central opening 19 is substantially axially in line with the magnetic gap 17, has connections as 20 and 21 for the passage of alternating current from the A. C. line represented by the numerals 40 and 41. This coil is stationary and the opening therein is of sufficient size to permit an armature to vibrate freely therein. Pivotally mounted within the coil 18 and between the poles 15 and 16, is an armature 22 also preferably of cast iron or material having similar qualities with respect to magnetic action. The pivotal mounting of such armature may be secured in any desired way, but preferably the base 10ᵇ of the magnet core portion 10 is provided with lateral extensions 23 having upstanding ears 24 receiving pivot screws 25 upon the points of which the armature 22 may pivot and vibrate. As the coil 18 is not carried by the armature, the vibrating mass of the armature 22 is comparatively small and the armature may be readily actuated. The armature 22 is provided with a contact plate 22' secured thereto by any convenient means, such as an angle bracket 24, and furnishing a broad flat surface for contact purposes. Such contact plate 22' is preferably of copper. A stop plate 26 adjustably secured to the part 10ᵃ of the magnet frame, as by screws 26', serves to limit the movement of the armature 22 in one direction. The other contact member is preferably a block of material such as carbon or graphite 27, which may be held in a holder 28 on the core 10, said holder being preferably supported from the magnet frame by convenient means, such as screws 29 extending through lugs 30 on the holder and insulated therefrom as by washers 31, and screwed into openings in the lugs 32 provided for that purpose upon the core piece 10. The contact holder is completely insulated from the magnet frame as by an insulation plate 33 in conjunction with the washers 31. The screw 34 serves to lock the contact block 27 in position in the holder, while the screw 35 is a binding screw for electrical circuit wire connection. 36 is an arm or brace extending across the back of the contact holder and receiving an adjustment screw 37 for adjusting the contact block in its holder and whereby the same may be readily and accurately positioned and adjusted and held to secure complete surface contact between the co-acting contact members 22' and 27, as will readily be appreciated. A flexible lead 38 is secured to the armature 22 for conducting the current to be passed by the vibrating contact plate 22'.

The circuit through the stationary contact member 27 and the vibrating contact plate 22' is normally open when direct current is passed through the magnet coil 12, for the reason that the path through the magnet core portion 10ᵃ and the armature 22 forms the shortest magnetic circuit. This fact is of importance as it prevents backward discharge of rectified current should the alternating current be for any reason cut off.

In making use of a vibrating rectifier as described, leads of an A. C. circuit are represented by the numerals 40 and 41. The coil 18 of the vibrator is connected to the leads 40 and 41 by the wires 20 and 21. This coil 18 is referred to as the actuating coil. One of the leads 40 of the A. C. is connected to a terminal S' of the storage battery S. The other lead 41 of the A. C. is connected to the binding screw 35 of the rectifier by means of the wire 42. The other terminal S'' of the battery S is connected by means of the wire 39 to the flexible lead 38 connected to the armature 22. The coil 12 of the rectifier has one of its leads 14 connected to the wire 39 while the other lead 13 of the coil 12 is connected to the wire 40. The rectification of half the alternations is accomplished by connecting the rectifier as above described. Assuming the wire 40 of the A. C. leads as positive during a half cycle, then current would pass into the actuating coil 18 by means of the wire 21 through this coil to the other lead 41 of the A. C. supply by means of the wire 20. Thus the armature 22 being the core to this coil 18 will be polarized with say the north pole at the upper end. Now going back to the wire 40 which we have assumed as positive for the instant, we find the same connected to the positive terminal of the battery, thus current will pass from the wire 40 through the battery S and out of the battery at the negative terminal S'' over the wire 39 and lead 38 through the armature 22 and contact plate 22' and graphite contact 27 and thence back to the A. C. line by the wires 42 and 41. The coil 12 being connected by the leads 13 and 14 respectively to the two terminals S' and S'' of the battery S, the poles 16 and 15 are also polarized constantly with say the pole 16 north and the pole 15 south. Thus it will be seen that the armature is supplied with a north pole at the top during the time the A. C. lead 40 is positive and therefore actuates to the left toward the pole 15 which is south. Then when the current reverses in the A. C. leads so that the wire 40 is now negative, the said armature 22 will actuate to the right because the armature polarity will change from north to south and consequently during this half cycle the contacts 22' and 27 will be open and the A. C. will not pass into the battery S. The current for actuating may be one branch circuit of the A. C. source while the A. C. rectified may be another branch of different potential, but both currents must be synchronous. Or various other relations may exist so long as like impulses are communicated to the actuating circuit and the rectification circuit.

Passage of the alternating current impulses in one direction through the coil 18 gives the armature 22 either positive or negative polarity and causes it to be attracted either to the pole 15 or to the pole 16 of the magnet. If attracted to the pole 15, the circuit is closed between contact members 22' and 27, and the corresponding impulse of the alternating current to be rectified is permitted to pass. If opposite polarity is imparted to the armature 22 and it is attracted to the magnet pole 16, then the circuit is broken and the corresponding impulse in the rectification circuit is not permitted to pass.

The device described, therefore, constitutes an apparatus capable of rectifying one-half the impulses of an alternating electric current, and it prevents the passage of impulses in the opposite direction. This result may be accomplished with rectifying apparatus of other constructions, that just shown and described, however, being the preferred form of apparatus for this purpose.

In Fig. 3 I show how, with my novel method of distribution and connection, both halves of the cycle of the alternating current can be rectified without having impedance or reactance in the circuit. An alternating current source of any suitable form is transmitted to the transformer T by circuit wires 50 and 51. Connected to these leads are leads 52 and 53, which supply alternating current to the actuating coils of the vibrators A, B, C and D which are preferably of the construction just described. A condenser X is also placed in this circuit to provide sufficient capacity. To distiguish from the rectification circuit shown in heavy lines, the actuating circuit, including wires 52 and 53, is shown in light lines. The transformer T is also provided with the alternating current lead 100 of the rectification circuit, which is connected to the contact 101 of the vibrator A by circuit wire 102, and also by the circuit wire 102 to the contact 103 of the vibrator D. The other rectification circuit lead 103' of the transformer T is connected by a circuit wire 104 to the contact 105 of the vibrator C and to the contact 106 of the vibrator B. Said lead 103' may be adjustable, as indicated in the drawings, to control the voltage in the induced alternating circuit. Thus the alternating current to be rectified is fed to one contact of each rectifier, and the other contact of each rectifier is connected as follows: Contact 107 of vibrator A is connected to contact 108 of vibrator C by means of the wire 109. This wire 109 constitutes the positive wire of the rectified or direct current circuit and connects to the pole S' of the battery S. The contact 110 of the vibrator D is connected to the contact 111 of the vibrator B by means of wire 112. This wire 112 also constitutes the negative wire to the negative pole S" of the battery S. Instead of the battery S, the direct current wires 109 and 112 may be connected to any direct current utility device to which the rectifier is applicable, or to both battery and utility device.

To follow out the functioning of the rectifiers in order to rectify the alternating current we will start with one of the alternating current impulses from the leads 50 and 51 and trace out the actuating circuit (shown in light lines). Only a small proportion of the alternating current need be used to actuate the rectifiers A, B, C and D.

Starting with the first impulse of alternating current flowing in the lead 50, said impulse passes by wire 53 through the condenser X to the top lead of the actuating coil 55 of vibrator C by means of the conductor 54, and after traversing the coil 55 it passes to the bottom lead of the actuating coil 56 of vibrator B by the conductor 57. Thence the alternating current impulse passes from the top of the coil 56 to the top of the coil 58 of vibrator D by the conductor 59. Thence the impulse passes from the bottom lead of the coil 58 to the bottom lead of the coil 60 of vibrator A by the wire 61, then this impulse flows back to the source or main 51 by the conductor 52. This completes the circuit for the actuation, and it can readily be seen that vibrator A and vibrator B will actuate in one direction, while vibrators C and D will actuate in the opposite direction simultaneously, assuming, of course, that the field frames of all the vibrators A, B, C and D are polarized or magnetized in the same direction. This magnetizing current is supplied in the apparatus of this diagram from the battery S being charged, the magnetizing coils all being connected in series. The positive terminal S' of the battery S, as shown, is connected by wire 201 to the coil 202 of the vibrator B, through this coil, by wire 203 to the coil 204 of vibrator C, by conductor 205, to the magnetizing coil 206 of vibrator D, and thence by wire 207 through the coil 208 of vibrator A, and thence to the negative pole S" of the battery S by means of the conductor 209, traversing all the magnet coils in the same direction so that the magnets of the several units have the same polarity.

Therefore upon passage of the actuating alternating current in the manner already described, for impulses in one direction through such actuating circuit vibrators A and B will have their contacts 101—107 and 106—111, respectively, closed, while contacts 105—108 of vibrator C and contacts 103—110 of vibrator D will be open, and upon the reversal of the alternating current in the current supply mains 50 and 51, said contacts of vibrators A and B will be open and said contacts of vibrators C and D will be closed.

Now tracing the alternating current to be rectified, we will take the impulse corresponding to that passed through the actuating coils and follow it through the contacts of the vibrators (assuming first that vibrators A and B have their contacts closed and vibrators C and D have their contacts open). Starting at the transformer T, this impulse passes over the wire 100 to the wire 102, which connects to the contacts 101 and 103 of vibrators A and D, respectively, but the contacts of vibrator D being open, the impulse will pass from contact 101 of vibrator A through contact 107 of vibrator A and wire 109 to the positive pole S' of the battery S, because vibrator C is open the same as vibrator D. The impulse further passes through the battery S and out from the negative terminal S" and wire 112 to vibrators B and D, but the said impulse meets with open circuit conditions at vibrator D and closed circuit conditions at vibrator B. Consequently the impulse passes from the wire 112 through contacts 106—111 of vibrator B, thence through the conductor 104 back to the transformer T by the wire 103', because, as stated before, vibrator C is open circuited. Thus one alternation has passed through the rectifier and battery (or utility device, or both), and now the alternating current will reverse its direction of flow so that the next impulse flows out of the wire 103' to the wire 104 through the contacts 105—108 of vibrator C (for the beforementioned current reversal occurring likewise in the actuating circuit has had the effect of closing the contacts of vibrators C and D and opening the contacts of vibrators A and B). Therefore this second impulse flows from the contact 108 and wire 109 to the positive terminal S' of the battery S, and thence through said battery (or utility device, or both) and its negative terminal S" and wire 112 to vibrator D which is also closed, and through its contacts 103—110 and wires 102 and 11 this impulse returns to the transformer T. Thus both alternations are made to pass in one direction through the battery S or any direct current utility device to which the current is applicable, or both battery and utility device. By the use of multiple connections, such, for example, as placing one or more additional vibrator units connected in multiple in the places where one is shown, or by connecting one or more additional complete rectifiers as described in multiple with each other, it will be obvious that the ampere capacity is thereby correspondingly increased.

For rectifying current of any considerable potential additional vibrators acting on the same principle may be utilized. Four vibrators provide but two breaking points in each circuit, that is, two on the alternating current circuit and two on the direct current circuit. The gap between the vibrator contacts is narrow when open, so it will require a number or plurality of breaks to operate the rectifying apparatus at any considerable potential. Preferably for about every 15 volts increase in the direct current circuit an additional set of vibrators will be used. Thus it will readily be seen that four vibrators are sufficient for 15 volts direct current, eight vibrators are sufficient for 30 volts direct current, and so on. Fig. 4 shows an arrangement of sixteen vibratory rectifying units whereby alternating current having a potential of, say, 60 volts may be rectified. In this arrangement the vibrators $A^1$, $A^2$, $A^3$ and $A^4$ are connected in series and perform a similar duty to the vibrator A in Fig. 3. The vibrators $B^1$, $B^2$, $B^3$ and $B^4$, $C^1$, $C^2$, $C^3$ and $C^4$, and $D^1$, $D^2$, $D^3$ and $D^4$ of Fig. 4 are similarly related to vibrators B, C, and D, respectively, of Fig. 3. The rectification is accomplished identically in the same manner as was shown in Fig. 3, with the advantage, however, that while each set of four vibrators of Fig. 4 (as $A^1$, $A^2$, $A^3$ and $A^4$) are connected in series and function the same as the corresponding single vibrator (as A) in Fig. 3, yet they provide four simultaneous breaking points. Inasmuch as these four vibrators make and break simultaneously, it will be seen that the gap or breaking space is widened four times as compared with one vibrator. Thus any desired potential may be rectified if sufficient multiples of the arrangement of Fig. 3 are made up as shown in Fig. 4. In Fig. 4 the circuit for electromagnets is omitted for simplicity of showing. As already stated, permanent magnets may be used.

Apparatus constructed and operating in accordance with the present invention affords numerous features of advantage. The apparatus is efficient, light and compact and easily operated and requires practically no attention. The rectifying apparatus requires but a single switch for the complete control thereof and is self starting when the alternating current is turned on. A battery left to be charged, for instance over night, will not be thrown off charge if the current charging should fail for one or more times during the night, for as soon as the current comes on after such failure, the apparatus will continue charging without the necessity of giving it further attention.

There are no coils on the moving member of the rectifying unit, so that the momentum of the moving parts is reduced and the same may be readily and easily operated. It is an advantageous feature of the apparatus that the contact members on such units are of copper and graphite with large surface area, and that there is therefore less ampere density per unit of area. With the contact members as shown there is the greatest ease and range of adjustment: The carbon or graphite contact member may be adjusted from time to time by the adjusting screw so as to take up for any loss by wear; and from the electrical standpoint, it will be observed that the voltage in the actuating circuit can be readily regulated, as by tapping it on the transformer at suitable points, so that practically any desired pull, for bringing the contact members together, may be secured, by the method of connection and distribution shown, any inductance in the direct or the alternating circuit is eliminated, and it becomes possible to secure any current regulation, as, for example from one ampere up to the capacity of the outfit without any adjustment being made in the apparatus. If it is desired to rectify currents of increased voltage, this can readily be accomplished by the provision of additional rectifying units; no circuit breakers need be used, and there is no occasion for the use of low voltage releases, as, for example, when charging batteries. Where the electromagnetic type of unit is used, backward discharge through the rectifier is avoided. The effective portion of the alternating current value can be utilized and the ineffective portion cut out by adjusting the extent through which the vibrator may vibrate, as by means of the adjusting plate and screw provided for that purpose. In charging a battery, for example, the vibrator may be moving through the air while the potential is rising to the battery potential and the circuit closed while current of sufficient potential is passing to overcome the battery's potential.

It is to be understood that the specific means illustrated are intended solely for the purpose of affording a clear understanding of my invention, and that my invention is not to be limited to the specific embodiments illustrated, but is as broad as my claims, and that various departures from and modifications in the particular embodiments illustrated may be resorted to with in the scope of my claims and without departing from my invention or sacrificing any of the advantages thereof.

Having thus described my invention, I claim:

1. In an alternating current rectifying system, an alternating current circuit, a work circuit, and a plurality of sets of series connected rectifying devices, each set connected through the work circuit between the terminals of the alternating current circuit, whereby said devices operate to rectify both waves of the alternating current circuit at substantially full potential.

2. In an alternating current rectifying system, an alternating current circuit, a direct current work circuit, and a plurality of independent vibrating rectifying devices connected through the work circuit, between the terminals of the alternating current circuit, whereby said devices operate to rectify both waves of the alternating current circuit at substantially full potential.

3. In an alternating current rectifying system, an alternating current circuit, a direct current work circuit, and two pairs of separate vibratory rectifying devices, one of the rectifying devices of each pair being adapted to permit the passage of current impulses in one direction only, and the other member of each pair being adapted to permit the passage of oppositely directed current impulses only and each pair connected across the alternating circuit terminals through the direct current work circuit.

4. In a current rectifying apparatus, a source of alternating current, each lead whereof is divided into two branches, a direct current work circuit similarly divided, a unitary vibratory rectifying device on each alternating current branch which passes current in one direction only, the directions being opposite in the devices on the leads of an alternating current branch, and connections between said devices and the branches of the work circuit, whereby both positive and negative waves of the alternating current are rectified into direct current.

5. In current rectifying apparatus, a source of alternating current, each lead whereof is divided into two branches, a plurality of vibratory rectifying units connected up in series on each branch, one set of units on one branch and one set on the other branch being adapted to permit passage of current in one direction and to present a plurality of gaps in series to prevent passage of current in the opposite direction, and the remaining sets of units being adapted to permit passage of current in the other direction and to present a plurality of gaps in series to prevent passage of current in the opposite direction, a direct current line likewise divided into branches, said branches being cross-connected to the sets of rectifying units on the alternating current branches, whereby both alternating current impulses are transmitted unidirectionally on the direct current line.

6. In apparatus for rectifying alternating current, a principal alternating current supply circuit, a branch actuating circuit for alternating current, a direct current work circuit, a plurality of vibratory rectifying units connected between the principal supply circuit and the work circuit, and means in the actuating circuit for actuating the said vibratory devices to open and close synchronously with the alternations of the alternating current to pass or restrict the passage of current of the principal circuit in such manner that the passage of impulses in the work circuit beyond the rectifying devices is unidirectional and substantially without induction or impedance.

7. In a vibratory rectifier, an electromagnet comprising a frame which is substantially continuous except for a magnetic gap therein, a vibrator of magnetic material mounted within the frame and extending through said gap, a stationary coil within the frame for actuating said vibrator and having an opening therein in which the vibrator is received, a contact member carried by said vibrator and extending outside the frame, and a stationary contact member supported by the frame and adapted to coact with the contact member carried by said vibrator.

8. In a vibratory rectifier, a magnet in the form of a two-piece frame, one of the pieces including the base and the other a side of the frame, a coil for said magnet encircling said side portion of the frame, a magnetic gap in said frame between said two pieces, a vibrator mounted within the frame and extending through said gap, a stationary actuating coil for said vibrator within the frame, a contact piece carried thereby outside the frame, and a stationary contact piece mounted on the exterior of the frame.

In testimony that I claim the foregoing I hereto set my hand this 28th day of October, 1916.

JAMES KNOX ELDERKIN, Jr.